United States Patent [19]
Hamasaki et al.

[11] Patent Number: 6,104,887
[45] Date of Patent: Aug. 15, 2000

[54] LENS HOOD

[75] Inventors: Takuji Hamasaki, Saitama-ken; Kazuhiro Hattori, Chiba-ken, both of Japan

[73] Assignee: Asahi Kogaku Kogyo Kabushiki Kaisha, Tokyo, Japan

[21] Appl. No.: 09/291,473

[22] Filed: Apr. 14, 1999

[30] Foreign Application Priority Data

Apr. 15, 1998 [JP] Japan .................................. 10-104782

[51] Int. Cl.⁷ .................................................. G03B 11/04
[52] U.S. Cl. ........................................... 396/534; 396/544
[58] Field of Search ..................... 396/544, 545, 396/534

[56] References Cited

U.S. PATENT DOCUMENTS

| | | | |
|---|---|---|---|
| 4,909,617 | 3/1990 | Boyd | 396/534 |
| 5,105,312 | 4/1992 | Tiffen et al. | 396/544 |
| 5,327,188 | 7/1994 | Kohmoto . | |

*Primary Examiner*—David M. Gray
*Attorney, Agent, or Firm*—Greenblum & Bernstein, P.L.C.

[57] ABSTRACT

Disclosed is a lens hood including a cylindrical body that is mounted to a lens barrel of the camera. An accessing opening is formed on the cylindrical body. In order to cover the accessing opening, a cover piece is detachably attached to the cylindrical body. When the cover piece is attached to the cylindrical body, the cover piece forms a part of a circumference of said cylindrical body.

14 Claims, 9 Drawing Sheets

LENS HOOD

BACKGROUND OF THE INVENTION

This invention relates to a lens hood mounted to a camera.

A lens hood is mounted to a camera, in order to shield a camera lens from light outside the subject area. The lens hood is mounted to the tip of the lens barrel by means of a bayonet mechanism or the like.

Further, in order to enhance the quality of photograph, a rotary filter (such as a polarization filter, a cross filter or the like) is mounted in front of the lens in the lens barrel. For example, the polarization filter is used to restrict the direction of vibration of the light entering the lens. The polarization filter is rotated about an optical axis of the lens, in order to change the direction of the vibration of the light to be allowed to pass.

The cross filter is used to add a special effect such as starburst (that is, radiating four spokes of light) on the image, and is made of a transparent plate having a grid of finely etched lines. The cross filter is rotated about an optical axis of the lens, in order to change the orientation of the starburst.

In case where the lens hood and the rotary filter are mounted to a SLR (single lens reflex) camera, a photographer adjusts the rotational position of the rotary filter, observing an subject through the rotary filter. Accordingly, the conventional lens hood is large (with respect to the lens barrel) enough to allow the photographer to insert his hand therein to rotate the rotatable filter.

However, when the photographer rotates the rotary filter viewing the subject, the view of the photographer may be interfered with the his hand inserted in the lens hood. Further, since the diameter of the conventional lens hood is large enough to allow the hand of the photographer to insert therein, the lens hood is not suitable for carrying.

In order to solve these problems, another type of lens hood is proposed. The lens hood of this type has an accessing opening formed on the circumference thereof. With such an arrangement, the photographer is able to insert his finger in the lens hood to operate the rotary filter. However, since the accessing opening allows the light to enter into the lens hood, the lens hood is not able to shield the lens from the light outside the subject area.

SUMMARY OF THE INVENTION

It is therefore an object of the present invention to provide a lens hood that is capable of shielding a camera lens from the light outside the subject area, that is small in size, and that enables a photographer to access a rotatable filter.

For the above object, there is provided a lens hood including a cylindrical body that is mounted to a lens barrel of a camera, an accessing opening formed on the cylindrical body, and a cover member which covers the accessing opening.

As constructed above, since the accessing opening is closed by the cover member, it is possible to shield a camera lens from the light outside the subject area. Further, the rotary filter is accessible through the accessing opening, when the cover member is moved from the assessing member. Thus is, it is not necessary to increase the size of the lens hood as in the conventional lens hood shown in FIG. 1.

In a particular arrangement, the cover member is a cover piece detachably provided to the cylindrical body. Conveniently, the cover piece forms a part of a circumference of the cylindrical body, when attached to the accessing opening. Optionally, the cover piece has an engaging member, while the cylindrical body has a receiving member which receives the engaging member.

In another particular arrangement, the cover member includes a cover ring rotatably provided to the lens hood. The cover ring has a window formed at a circumference thereof. The window of the cover ring and the accessing opening of the cylindrical body are aligned with each other when the cover ring is rotated to a predetermined rotational position. Optionally, a plurality of accessing openings are formed on the cylindrical body. The plurality of accessing openings are arranged on the same circumference of the cylindrical body. Further, the window of the ring is aligned with one of the plurality of accessing openings at plurality of rotational positions.

DESCRIPTION OF THE PREFERRED EMBODIMENT

The embodiments of the lens hood according to the present invention are described below.

Figure 1:
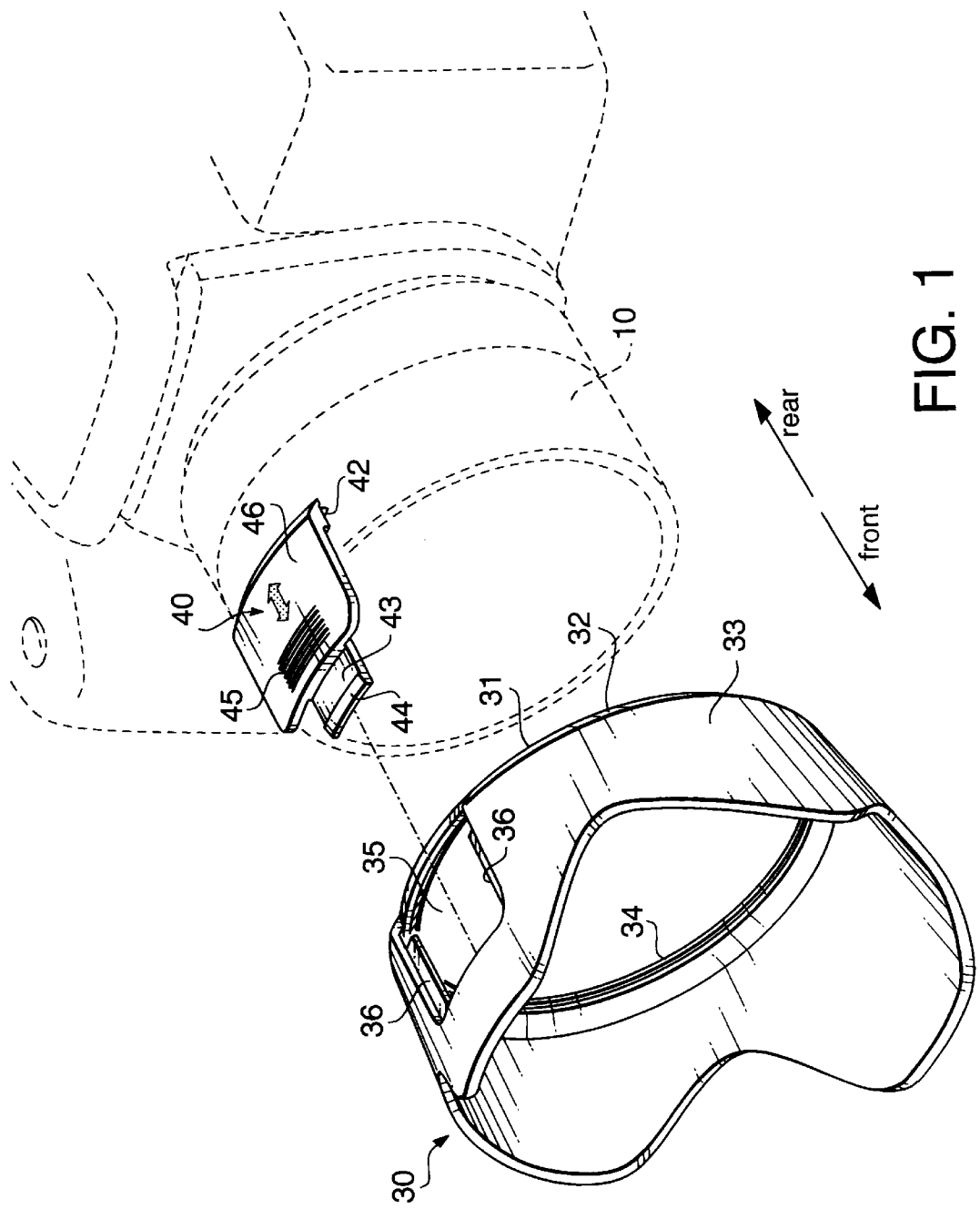
FIG. 1 is a perspective view of a lens hood according to the first embodiment.

FIG. 1 is a perspective view of a lens hood 30 according to the first embodiment. As shown in FIG. 1, the lens hood 30 is mounted to a tip of a lens barrel 10 of a camera. The lens hood 30 has a substantially cylindrical shape. Hereinafter, an axial end of the lens hood 30 proximate to the lens barrel 10 is referred to as 'rear ends'. Further, another axial end of the lens hood 30 distal from the lens barrel side 10 is referred to as 'front end'.

The lens hood 30 includes a root portion 31 mounted to the lens barrel 10. The root portion 31 has a ring-shape which inner diameter is larger than the outer diameter of the lens barrel 10. The lens hood 30 further includes a tapered cylindrical portion 32 which extends frontward from the root portion 31. The tapered cylindrical portion 32 is tapered so that the diameter of the front end thereof is larger than that of the rear end thereof. Further, the lens hood 10 includes an end portion 33 which extends frontward from the tapered portion 32. The end portion 33 is slightly tapered so that the diameter of the front end thereof is larger than that of the rear end thereof. The end portion 33, the tapered portion 32 and the root portion 31 constitute a 'cylindrical body'.

Figure 2:
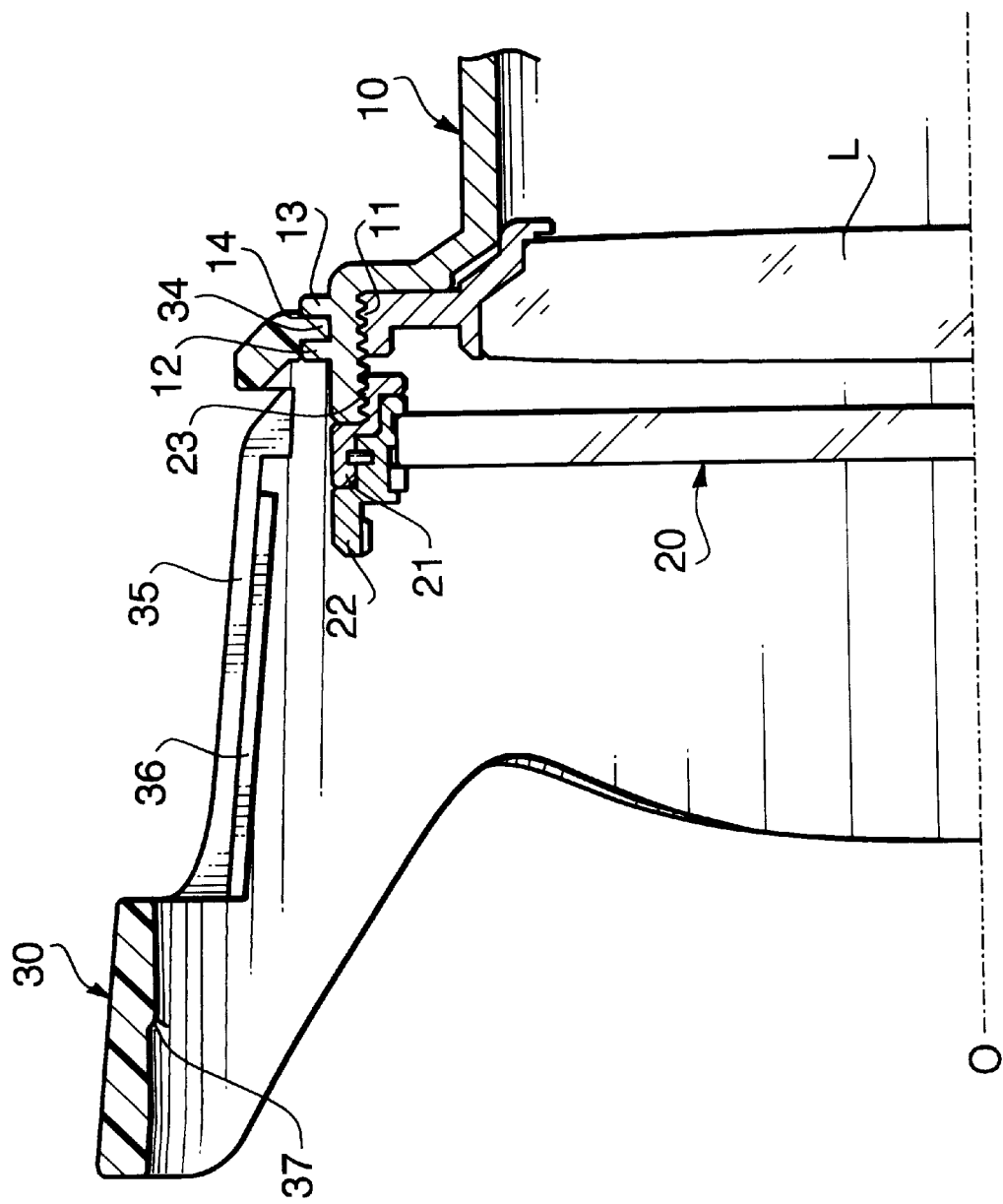
FIG. 2 is a sectional view of the lens hood of FIG. 1, with a cover member being removed.

FIG. 2 is a schematic view of the lens hood 30. In order to mount the lens hood 30 to the lens barrel 10, a bayonet groove 14 is formed on the outer surface of the lens barrel 10. The bayonet groove 14 extends along the circumference of the lens barrel 10. Further, a bayonet projection 34 is formed on the inner surface of the lens hood 30, which engages the bayonet groove 14. The bayonet groove 14 and the bayonet projection 34 constitute a bayonet mechanism. By putting the lens hood 30 on the lens barrel 10 so that the bayonet projection 34 engages the bayonet groove 14, the lens hood 30 is securely mounted on the lens barrel 10. Since the structure of the bayonet mechanism is well known, the detailed description thereof is omitted.

As shown in FIG. 2, a lens L is mounted in the lens barrel 10. Further, a rotary filter 20 (such as a polarizing filter, a cross filter or the like) is mounted in front of the lens L in the lens barrel 10. The rotary filter 20 includes a support ring 21 mounted in the lens barrel 10 and a rotatable ring 22 rotatably supported by the support ring 21. In particular, the support ring 21 has an external thread 23 at the circumference thereof, which engages an internal thread 11 formed on the inner surface of the lens barrel 10. The rotatable ring 22 is able to rotate about an optical axis O of the lens L held by the lens barrel 10.

Figure 3:
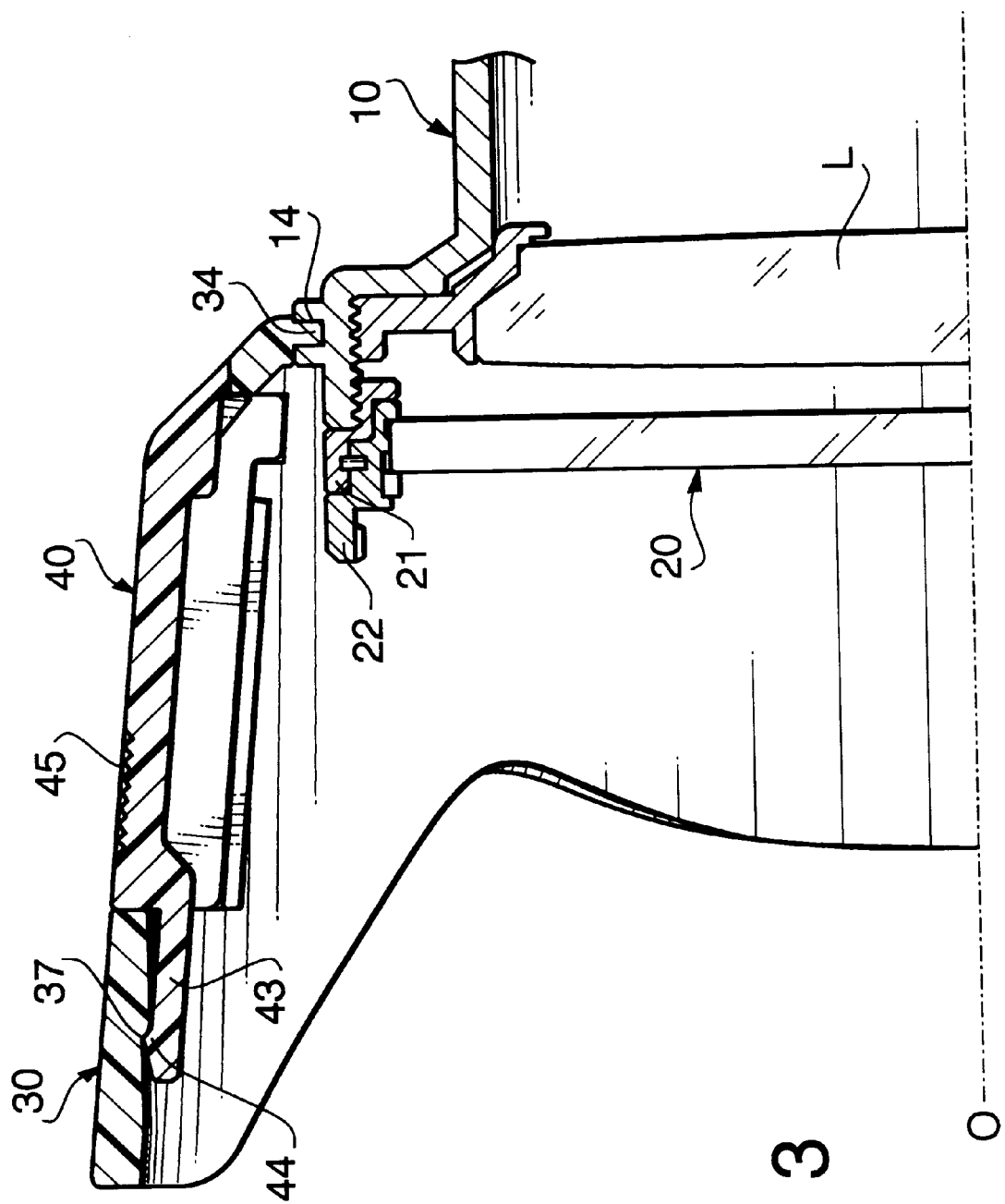
FIG. 3 is a sectional view of the lens hood of FIG. 1, with the cover member being installed.

In order to enable a photographer to operate the rotary filter 20, an accessing opening 35 is formed on the cylindrical body of the lens hood 30. The accessing opening 35 is substantially rectangular-shaped, and is formed at a position proximate to the rotary filter 20 mounted on the lens hood 10. Further, the accessing opening 35 is large enough to allow a photographer to insert his finger in the lens hood 30 thereby to rotate the rotatable frame 21 of the rotary filter 20. The accessing opening 35 is covered by a cover piece 40 as shown in FIG. 3. When the cover piece 40 is attached to the accessing opening 35, the cover 40 forms a part of the circumference of the cylindrical body of the lens hood 30.

Figure 4A:
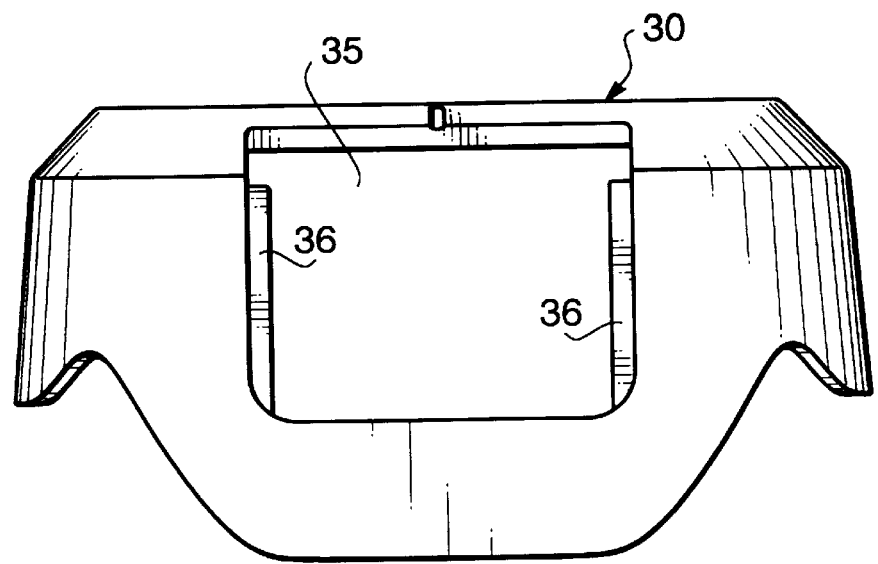
FIGS. 4A and 4B are plan views of the lens hood of FIG. 1.
Figure 4B:
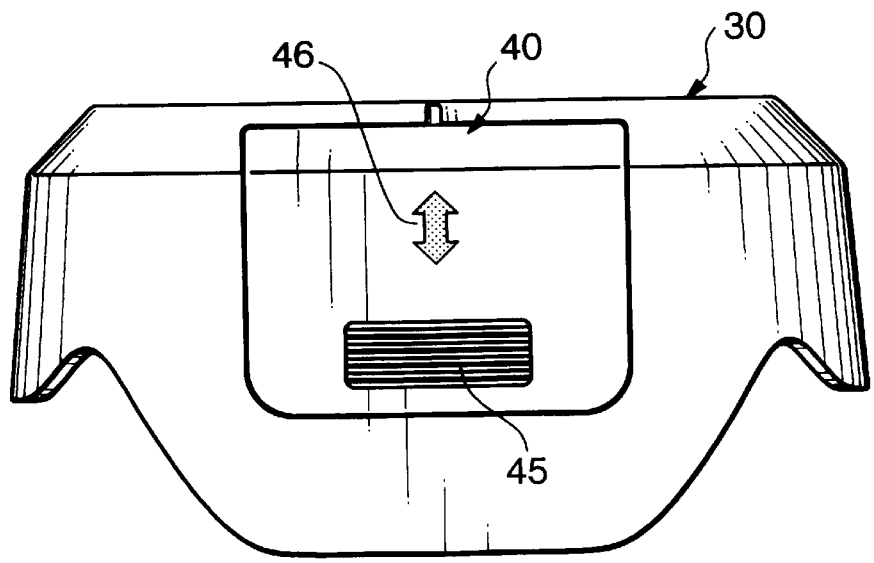

The structure of the cover piece 40 (and an arrangement to detachably attach the cover piece 40 to the accessing opening 35) is detailed. FIGS. 4A and 4B are plan views of the lens hood 30 with the cover piece 40 being attached and detached, respectively. As shown in FIG. 4A, a pair of guide rails 36 are formed on both sides of the opening 35. The guide rails 36 are thinner than the lens hood 30, so that the guide rails 36 retracts from the outer surface of the lens hood 30 by a certain amount.

Figure 5A:
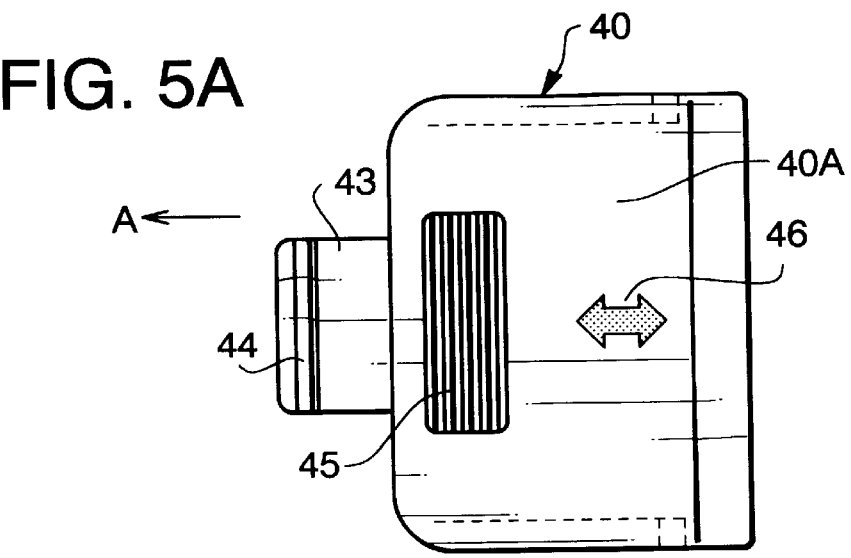
FIGS. 5A, 5B and 5C are top, side and bottom views of a cover piece.
Figure 5B:
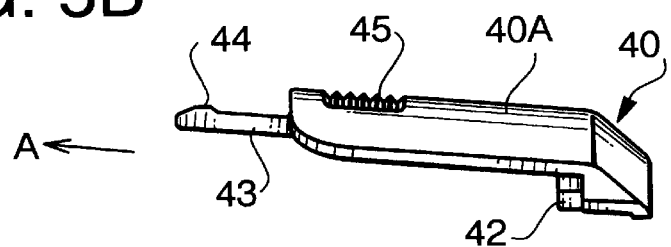
Figure 5C:
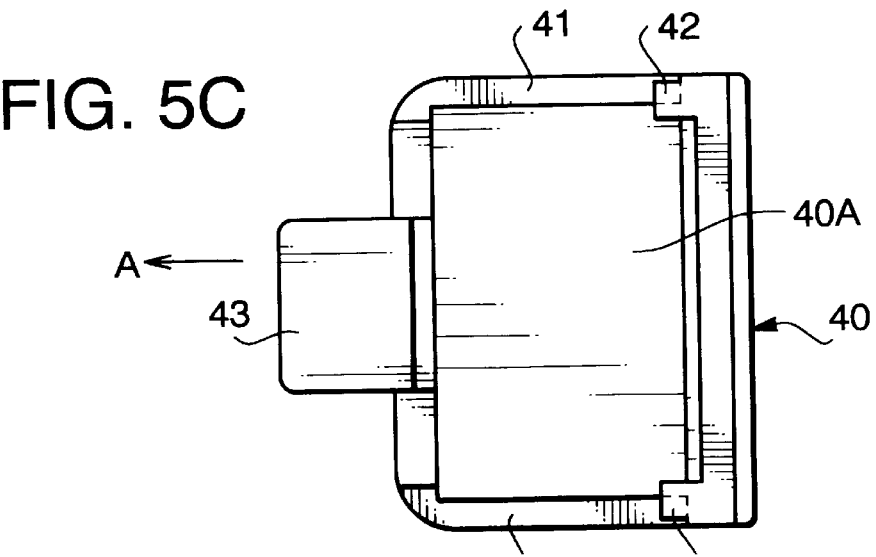

FIGs. 5A, 5B and 5C are a top view, a side view and a bottom view of the cover piece 40. The cover piece 40 is attached to the accessing opening 35 in the direction denoted by A in FIGS. 5A, 5B and 5C. As shown in FIG. 5A, the cover piece 40 has a plate portion 40A. The plate portion 40A is so constituted to form a part of the circumference of the lens hood 30. Both side ends 41 (FIG. 5C) of the plate portion 40A is thinner than the other part of the plate portion 40A. Further, as shown in FIG. 5B, a pair of hooks 42 extends in the inserting direction A from the tail end of the plate portion 40A. The hooks 42 extend in parallel to the plate portion 40A, so that the hooks 42 and the side ends 41 sandwich the guide rails 36 of the accessing opening 35 (FIG. 2). A stick-shaped projection 43 extends in the inserting direction A from the head end of the plate portion 40A. When the cover piece 40 is attached to the accessing opening 35, the stick-shaped projection 43 slides along the inner surface of the lens hood 30 (FIG. 3), and engages a step portion 37 (FIG. 3) formed in front of the accessing opening 35. The step portion 37 is formed on the inner surface of the lens hood 30, which thickness is partially thinner than its surrounding part of the hood 30. Further, the plate portion 40A is provided with a grip portion 45 on the upper surface thereof. The user touches the grip portion 45 to attach the cover piece 40 to the accessing opening 35 and to detach the cover piece 40 from the accessing opening 35. An arrow-mark 46 is formed on the surface of the plate portion 40A of the cover piece 40, indicating the attaching direction and the detaching direction of the cover piece 40.

The side ends 41 and the stick-shaped projection 43 of the cover piece 40 constitute an "engaging member", while the step portion 37 and the guide rails 36 of the lens hood 30 constitute a "receiving member" which receives the engaging member.

On attaching the cover piece 40 to the accessing opening 35, the photographer puts the cover piece 40 on the accessing opening 35 so that the side ends 41 (FIG. 5C) of the cover piece 40 are placed on the guide rails 36 (FIG. 4A) of the accessing opening 35. Then, the photographer puts his finger on the grip portion 45, and pushes the cover piece 40 frontward. With such an operation, the stick-shaped projection 43 slides along the inner surface of the cylindrical body of the lens hood 30, and engages the step portion 37. At the same time, the side ends 41 and the hooks 42 (of the cover piece 40) sandwich the guide rails 36 of the accessing opening 35. With this, the accessing opening 35 is closed by the cover piece 40, so that the light is not allowed to enter into the interior of the lens hood 30 through the accessing opening 35.

When the photographer adjusts the rotational position of the rotary filter 20, the photographer puts his finger on the grip portion 45 and drags the cover piece 40 rearward, slightly pushing the grip portion 45 inward (in the direction toward the interior of the lens hood 30). Since the grip portion 45 is pushed inward, the lens hood 30 is partially deformed so that the stick-shaped projection 43 is released by the step portion 37 of the lens hood 30. Accordingly, the cover piece 40 is slides out of the accessing opening 35. Through the accessing opening 35, the photographer is able to insert his finger in the interior of the lens hood 30 to adjust the rotational position of the rotary filter 20. After the adjustment of the rotary filter 20, the photographer attaches the cover piece 40 to the accessing opening 35 again. With this, the accessing opening 35 is covered by the cover piece 40, and therefore the light does not enter into the interior of the lens hood 30 through the accessing opening 35. In this state, the cover piece 40 forms a part of the circumference of the circumference of the cylindrical body of the lens hood 30.

As described above, according to the first embodiment, since the accessing opening 35 is closed by t he cover piece 40, the invasion of the light (outside the subject area) can be prevented. Further, since the rotary filter 20 is accessible through the accessing opening 35 when the cover piece 40 is detached, it is not necessary to increase the size of the lens hood 30 as in the conventional lens hood shown in FIG. 1.

Figure 6:
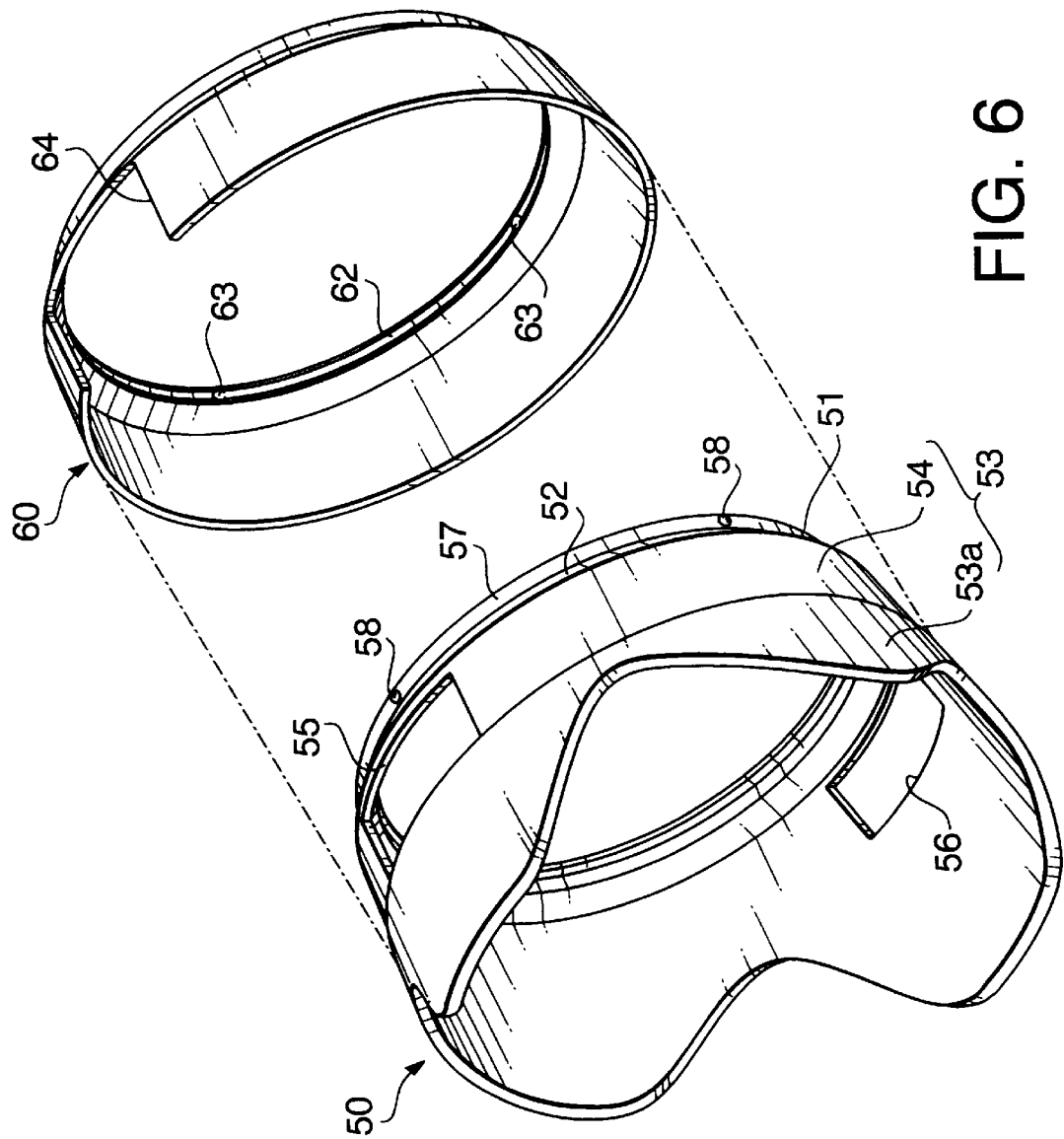
FIG. 6 is a perspective view of a lens hood according to the second embodiment.
Figure 7:
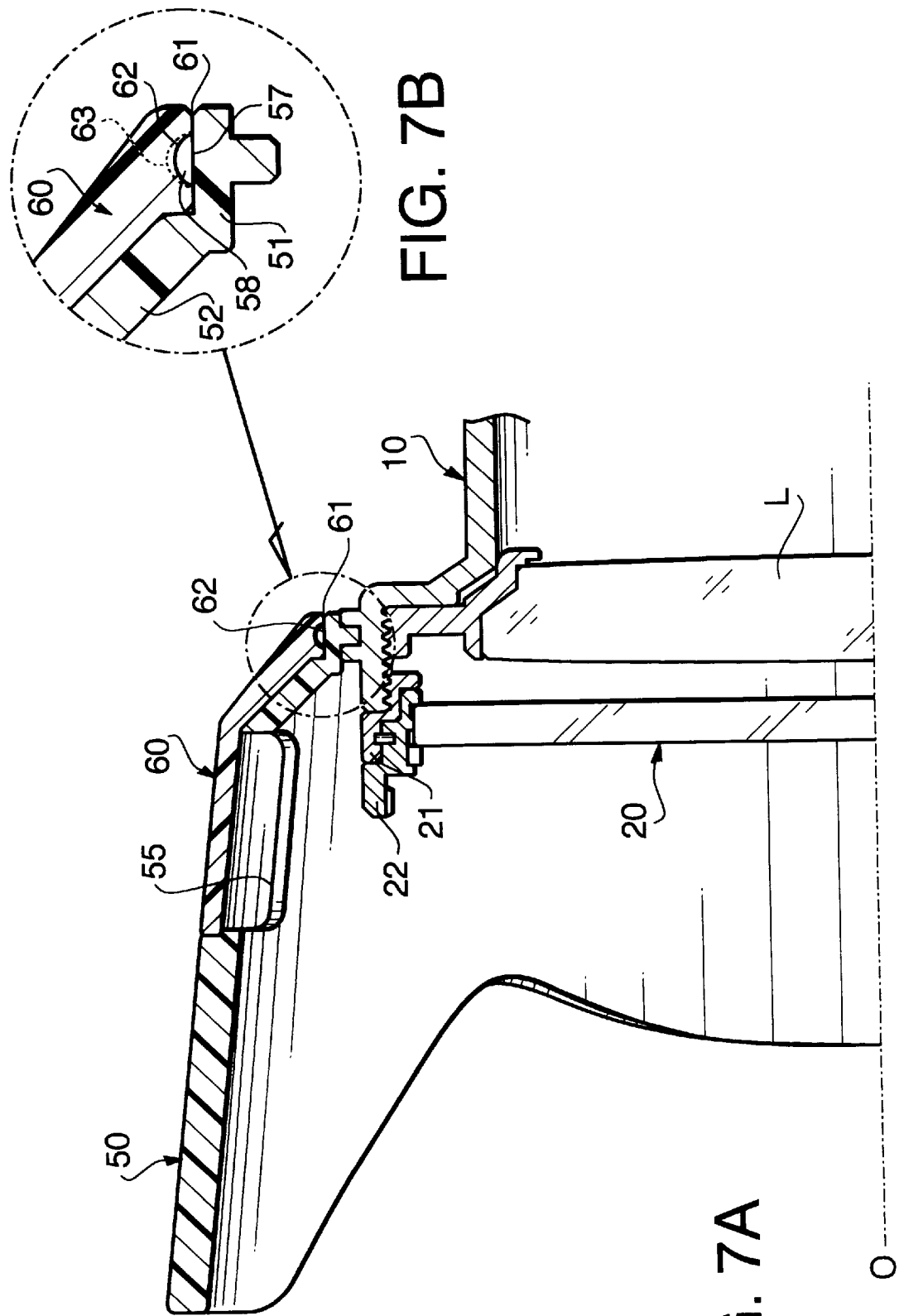
FIGS. 7A and 7B is a sectional view and an enlarged sectional view of the lens hood of FIG. 6.
Figure 8:
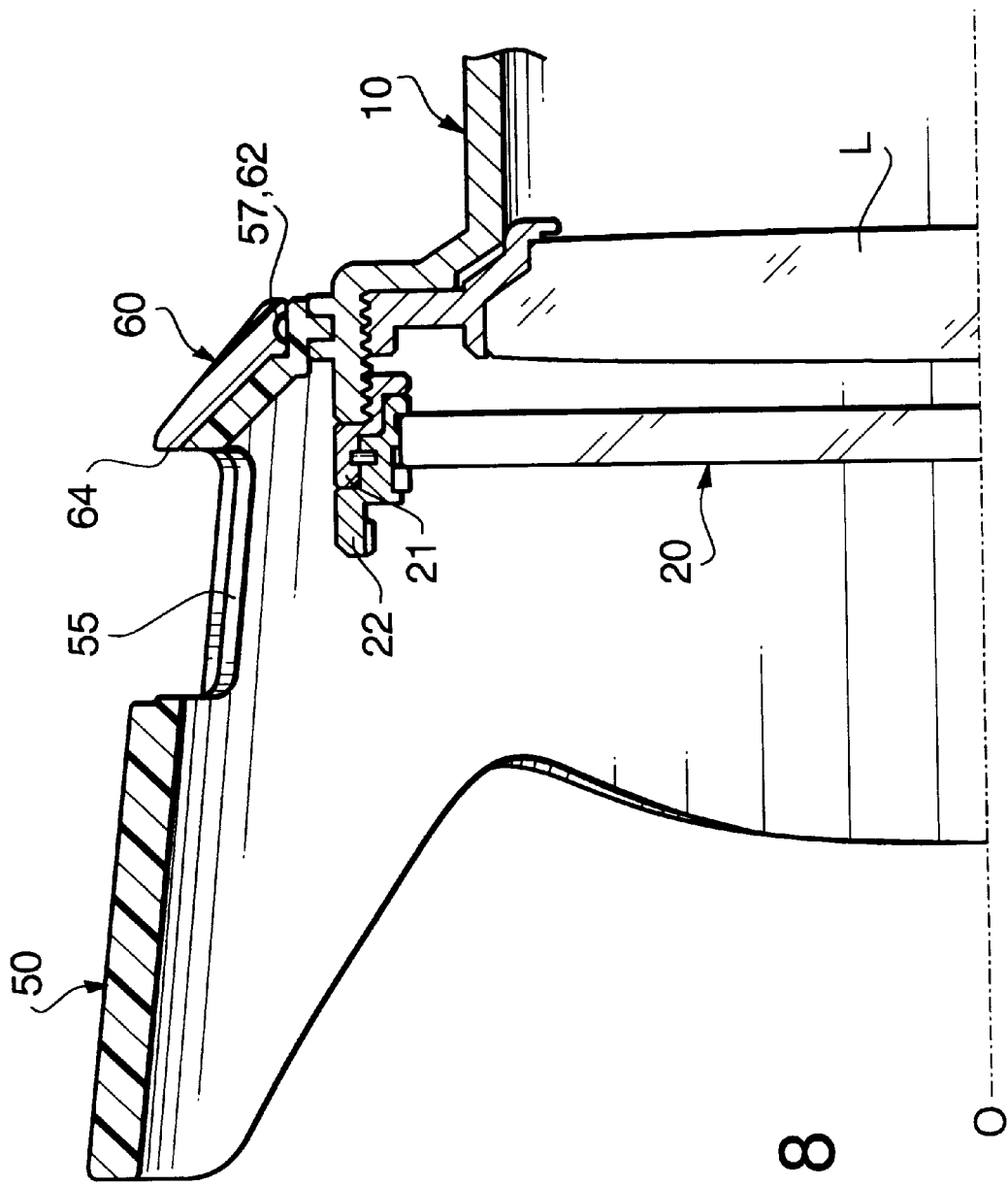
FIG. 8 is a sectional view of the lens hood of FIG. 6.

FIG. 6 is a perspective view of the lens hood 50 according to the second embodiment of the present invention. The lens hood 50 is mounted on the lens barrel 10 which is the same as that of the first embodiment. In the second embodiment, 'front' and 'rear' are defined in a similar manner as in the first embodiment.

As in the first embodiment, the lens hood 50 includes an end portion 53, a tapered portion 52 and a root portion 51. The end portion 53 is divided into a front half 53a and a rear half (hereinafter, referred to as a land portion 54).

The front half 53a and the land portion 54 are both tapered.

However, a step is formed between the outer surfaces of the front half 53a and the land portion 54. That is, the outer diameter of the rear end of the front half 53a is larger than the outer diameter of the front end of the land portion 54.

Two accessing openings 55 and 56 are formed on the land portion 54. The accessing openings 55 and 56 are separated by 180 degrees with respect to the optical axis of the lens L mounted in the lens barrel 10.

Figure 9:
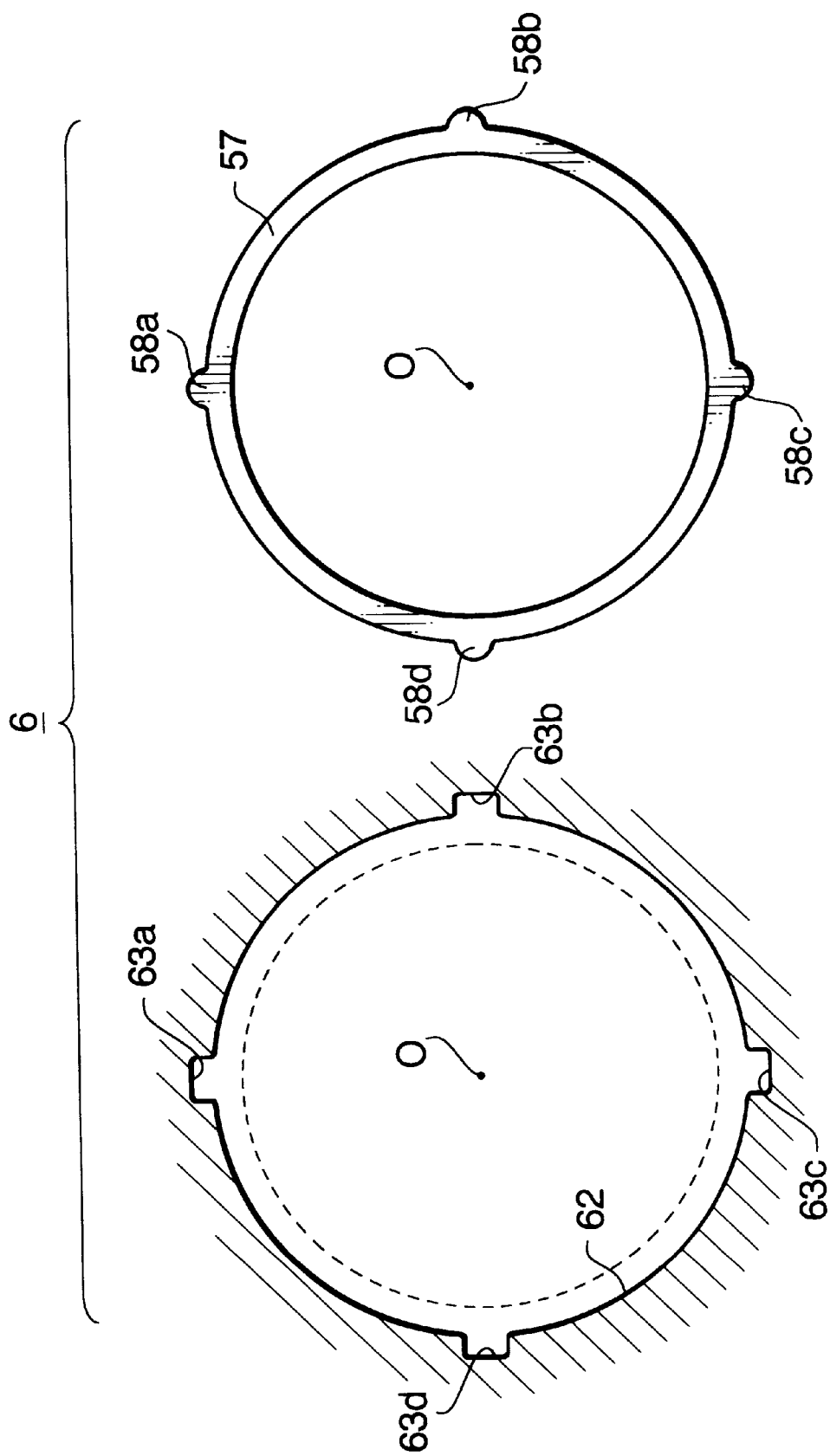
FIG. 9 is a schematic view of a click mechanism according to the second embodiment.

In order to cover the accessing openings 55 and 56, a cover ring 60 is detachably provided around the land portion 54 of the lens hood 50. FIGS. 9 and 10 are sectional views of the lens hood 50 with the cover ring 60 being attached and detached. The cover ring 60 has an inner diameter such that the cover ring 60 fits on the outer surface of the land portion 54 of the lens hood 50. A circumferential groove 62 is formed on an inner surface of the cover ring 60, which slidably engages a circumferential projection 57 formed on an outer surface of the land portion 54 of the lens hood 50. Due to the slidable engagement between the circumferential groove 62 and the projection 57, the cover ring 60 is rotatable with respect to the land portion 54 of the lens hood 50. The circumferential projection 57 and the circumferential groove 62 constitute a guiding mechanism which guides the cover ring 60 around the lens hood 50.

The cover ring 60 is provided with a window 64. By aligning the window 64 and one of the accessing openings 55 and 56, the photographer is able to insert his finger into the lens hood 50 to adjust the rotational position of the rotary filter 20. A click mechanism is provided for holding the cover ring 60 at the positions where the window 64 and respective accessing openings 55 and 56 are aligned. As schematically shown in FIG. 9, the click mechanism (denoted by 6) includes four click recesses 63a, 63b, 63c and 63d formed on the circumferential groove 62 and projections 58a, 58b, 58c and 58d formed on the circumferential projection 57. The click recess 63a, 63b, 63c and 63d are separated by 90 degrees with respect to the optical axis O. Also, the click projections 58a, 58b, 58c and 58d are separated by 90 degrees with respect to the optical axis O.

The position of the click projections and recesses are determined as follows: when the click projections 58a, 58b, 58c and 58d respectively engage click recesses 63a, 63b, 63c and 63d , the window 64 is aligned with one accessing hole 55. Further, the click projections 58a, 58b, 58c and 58d respectively engage click recesses 63c , 63d , 63a and 63b, the window 64 is aligned with another accessing hole 56. On the other hand, when the click projections 58a, 58b, 58c and 58d respectively engage click recesses 63b, 63c , 63d and 63a, the window 64 is covered by the cover ring 60. Similarly, when the click projections 58a, 58b, 58c and 58d respectively engage click recesses 63d , 63a, 63b and 63c , the window 64 is covered by the cover ring 60. With such a click mechanism, the photographer is able to easily align the window 64 of the cover ring 60 and one of the accessing holes 55 and 56.

When the photographer adjust the rotational position of the rotary filter 20 mounted in the lens barrel 10, the photographer rotates the cover ring 60 until the click recess 63 fits one of the click projections 58 (that is, the window 64 of the cover ring 60 is aligned with one of the accessing opening 55 and 56). Through the window 64 and one of the accessing opening 55 and 56, the photographer is able to insert his finger in the interior of the lens hood 50 to adjust the rotational position of the rotary filter 20.

After the adjustment of the rotary filter 20, the photographer again rotates the cover ring 60 by 90 degree. In this state, the accessing openings 55 and 56 are covered by the cover ring 60, and therefore the light does not enter into the interior of the lens hood 50 through the accessing openings 55 and 56.

Further, in case where the window 64 of the cover ring 60 is aligned with the lower accessing opening 56, the photographer is able to insert his finger in the lens hood 50 from the bottom side of the lens hood 50. Generally, the bottom side of the lens hood 50 is in the shade. Thus, even when the accessing opening 56 is not covered by the cover ring 60, the possibility of light intrusion (through the accessing opening 56 and the window 64) is relatively low.

As described above, according to the second embodiment, since the accessing openings 55 and 56 are closed by the cover ring 50, the invasion of the light outside the subject area can be prevented. Further, since the rotary filter 20 is accessible through the window 64 and one of the accessing openings 55 and 56 when the cover ring 64 is rotated to predetermined position, it is not necessary to increase the size of the lens hood 30 as in the conventional lens hood shown in FIG. 1. Further, in the second embodiment, since the cover ring 60 is not detached from the lens hood 50, there is no possibility that the photographer loses the cover ring 60.

Although the lens hood is described herein with respect to the preferred embodiments, many modifications and changes can be made without departing from the spirit and scope of the invention. Further, the lens hood according to the above described embodiments can be applied to a silver halide camera, a digital camera (using CCD) or the like.

The present disclosure relates to subject matters contained in Japanese Patent Application No. HEI 10-104782, filed on Apr. 15, 1998, which is expressly incorporated herein by reference in their entirety.

What is claimed is:

1. A lens hood mounted to a camera, said lens hood comprising:
    a cylindrical body that is mounted to a lens barrel of said camera;
    an accessing opening formed on a circumferential surface of said cylindrical body, said accessing opening allowing a user to manipulate an object within said lens hood; and
    a cover member which covers said accessing opening without preventing light from passing through said lens hood to a lens of said camera.

2. The lens hood according to claim 1, said cover member comprising a cover piece which is detachably attached to said cylindrical body.

3. The lens hood according to claim 2, wherein said cover piece comprising a part of a circumference of said cylindrical body, when said cover piece is attached to said accessing opening.

4. The lens hood according to claim 2, wherein said cover piece is slid in an axial direction of said cylindrical body, when said cover piece is attached to said cylindrical body.

5. The lens hood according to claim 2, said cover piece having an engaging member,
    said cylindrical body having a receiving member which receives said engaging member.

6. The lens hood according to claim 1, said cover member comprising a cover ring rotatably provided to said lens hood, said cover ring having a window formed at a circumference thereof,
    wherein said window and said accessing opening are aligned with each other when said cover ring is rotated to a predetermined rotational position.

7. The lens hood according to claim 6, wherein a plurality of accessing openings are formed on said cylindrical body, said plurality of accessing openings being arranged on the same circumference of said cylindrical body.

8. The lens hood according to claim 7, wherein said window of said cover ring is aligned with one of said plurality of accessing openings at plurality of rotational positions.

9. The lens hood according to claim 6, wherein said cover ring is mounted outside said lens hood.

10. The lens hood according to claim 9, further comprising a rotatable guiding mechanism which guides said cover ring around the cylindrical body.

11. The lens hood according to claim 6, further comprising a click mechanism which holds said cover ring at a position where said window of said cover ring is aligned with one of said accessing opening.

12. The lens hood of claim 1, wherein said object is a filter.

13. A lens hood mounted to a camera, said lens hood comprising:

a cylindrical body that is mounted to a lens barrel of said camera;

an accessing opening formed on a wall of said cylindrical body; and a cover piece which covers said accessing opening, said cover piece being detachably attached to said cylindrical body, wherein said cover piece comprising a part of a circumference of said cylindrical body, when said cover piece is attached to said cylindrical body.

14. A lens hood mounted to a camera, said lens hood comprising:

a cylindrical body that is mounted to a lens barrel of said camera;

an accessing opening formed on a wall of said cylindrical body; and a cover ring which covers said accessing opening, said cover ring being rotatably mounted on an outer surface said lens hood, said cover ring having a window formed at a circumference thereof, wherein said window of said ring is aligned with one of said plurality of accessing openings at plurality of rotational positions.

* * * * *